(12) United States Patent
Hall et al.

(10) Patent No.: US 7,147,965 B2
(45) Date of Patent: Dec. 12, 2006

(54) PRESSURE-BALANCED BATTERY FOR DOWNHOLE TOOLS

(76) Inventors: David R. Hall, 2185 S. Larsen Pkwy., Provo, UT (US) 84606; Joe R. Fox, 2185 S. Larsen Pkwy., Provo, UT (US) 84606

( * ) Notice: Subject to any disclaimer, the term of this patent is extended or adjusted under 35 U.S.C. 154(b) by 374 days.

(21) Appl. No.: 10/453,290

(22) Filed: Jun. 3, 2003

(65) Prior Publication Data

US 2004/0248000 A1    Dec. 9, 2004

(51) Int. Cl.
   *H01M 2/02*      (2006.01)
   *H01M 10/00*      (2006.01)
(52) U.S. Cl. .................. 429/176; 429/164; 429/127
(58) Field of Classification Search ................ 429/176, 429/127, 164
See application file for complete search history.

(56) References Cited

U.S. PATENT DOCUMENTS

| 2,654,960 | A |   | 10/1953 | Hewitt |         |
|-----------|---|---|---------|--------|---------|
| 4,109,062 | A |   | 8/1978  | McCartney |      |
| 4,648,471 | A | * | 3/1987  | Bordon | 175/4.55 |
| 5,326,652 | A | * | 7/1994  | Lake   | 429/127 |
| 5,516,603 | A | * | 5/1996  | Holcombe | 429/127 |
| 6,007,932 | A | * | 12/1999 | Steyn  | 429/31  |
| 6,187,469 | B1 |  | 2/2001  | Marincic |       |
| 6,392,317 | B1 | * | 5/2002  | Hall et al. | 307/90 |
| 6,528,204 | B1 | * | 3/2003  | Hikmet et al. | 429/128 |
| 6,705,406 | B1 | * | 3/2004  | Das et al. | 166/381 |
| 2004/0265682 | A1 | | 12/2004 | Hudson |         |

* cited by examiner

*Primary Examiner*—Patrick Joseph Ryan
*Assistant Examiner*—Thomas H. Parsons
(74) *Attorney, Agent, or Firm*—Daniel P. Nelson; Tyson J. Wilde

(57) ABSTRACT

Pressure-balanced primary and secondary batteries suited for supplying power to downhole tools and for powering a downhole telemetry network. The battery comprises an electrochemical generator disposed within at least a partially compliant enclosure or housing. The compliant enclosure permits pressurization of the electrochemical generator, thereby compensating for the increased temperature downhole. By permitting the electrochemical generator to be pressurized, the thermal range of the battery is extended to beyond 120.degree. C. The electrochemical generator comprises flexible components comprising an ionic conductor intermediate anode and cathode materials, a current collector, and a terminal. The battery may be installed within a recess in the wall of the downhole tool or within an annulus formed by the inside wall of the tool and a liner. In another embodiment of the invention, the battery may be located within an operative portion of a selected downhole tool, itself.

20 Claims, 7 Drawing Sheets

PRESSURE-BALANCED BATTERY FOR DOWNHOLE TOOLS

RELATED APPLICATIONS

None

BACKGROUND OF THE INVENTION

This invention relates to primary and secondary batteries for use downhole for powering a telemetry network and other downhole tools. More specifically, this invention relates to a battery or a fuel cell having internal components that are pressurized to the ambient pressure found downhole, to depths of 20,000 feet or more, in order to compensate for the downhole thermal conditions above 120° C.

Pressure and temperature conditions found downhole to depths of 20,000 feet or more are generally in excess of 10,000 psi and 200° C., respectively. Presently, the applicants know of no batteries commercially available that will function with high power and long life under such conditions.

The factors affecting downhole pressure are generally the depth of drilling, the hardness and continuity of the subterranean formations being drilled, the composition of the drilling fluid being used, and the under-balanced condition maintained in the well bore. Similar factors are also relevant to the temperature in the well bore. The extreme pressure and thermal conditions in deep wells contribute to premature battery degradation in downhole applications.

Generally, downhole batteries are self-contained in their own sealed containers that protect them from ambient conditions, including high pressure and temperature. The need to protect the battery components from external pressure requires an expensive pressure housing in the downhole tool, and the physical constraints imposed by the geometry of a downhole tool often mean that the batteries must intrude on the flow space within the tool, or they must be limited to relatively small diameters, reducing overall power density. Moreover, high pressure housings are always subject to leakage which may lead to a catastrophic failure of the battery and damage to the surrounding electronic components as well.

The researcher is referred to U.S. Pat. No. 6,187,469, to Marincie et al., incorporated herein, as an example of a downhole battery system. '469 teaches individual cells mounted end to end and interlocked together to prevent rotation of the cells relative to one another. The cells are electrically connected and mounted between an inner and outer tube. The housing for the battery is sufficiently strong to resist downhole pressures and is provided with vents for the discharge of gases.

Another reference of interest is U.S. Pat. No. 6,224,997, to Papadopoulos, incorporated herein. Papadopoulos teaches a flexible battery pack for powering downhole electronic equipment. The pack includes a plurality of electrochemical cells connected and tied together in a stacked relationship by a pair semi cylindrical encapsulating shells which form a primary containment for the cells. The shells comprise a glass fiber reinforced plastic material. The primary containment is sealed within a stainless steel tube which is provided to hold the components in place during operation. Electrical conductors are also provided to transmit the energy of the battery to selected downhole equipment. Each cell is sealed to resist the downhole environment and a venting mechanism is provided.

A pressure-equalized electrochemical battery system is disclosed in U.S. Pat. No. 4,087,590, to Kraft. Kraft discloses a pack of ordinary, commercially available batteries that are provided with a common electrolyte-filled reservoir coupled to each battery by a small tube. The reservoir includes a compliant diaphragm which, when exposed to pressure, applies the pressure to the reservoir of electrolyte to force it into the battery. Forceful filling the cells equalizes their internal and external pressures. Kraft is intended for deep-sea applications and would not meet the constraints of a downhole tool string.

U.S. Pat. No. 6,117,583, to Nilsson, discloses a battery that is intentionally pressurized, but it is pressurized above ambient pressure. In lead-acid batteries, the $PbSO_4$ that formed during discharge has a higher volume than the $Pb$ and $PbO_2$ from which it is formed. When it is discharged the shrinkage causes loss of contact between the active components and the current conducting lead frame. This is overcome by providing a strong housing that keeps the battery under high pressure.

U.S. Pat. No. 6,253,847, to Stephensen, discloses a permanent downhole power source for a producing well, using the steel casing coated with iron oxide as the cathode. $Fe_2O_3$ is reduced to $FeO$. A separate piece of Zinc, as an anode, is provided which corrodes and is consumed. A cement treated with additives to increase its conductivity serves as the electrolyte.

Although the temperatures in some wells may exceed 200° C., the drilling fluid to drill those holes never boils, because the applied pressure exceeds the vapor pressure of the mud. Commercial batteries are generally limited to temperature conditions below 120° C. because of electrolyte boil off. A unique condition in a well is that there is a corresponding increase in pressure and temperature as the bore hole deepens. If it were possible to simultaneously expose the battery components subject to boil off to the increasing temperature and pressure, boil off would not likely occur, and the range of the battery's performance would be extended.

What is needed is a long life battery that will accommodate the physical constraints of downhole tools and be functional to depths to 20,000 feet or more.

SUMMARY OF THE INVENTION

The present invention presents pressure-balanced primary and secondary batteries or fuel cell for powering a downhole telemetry network as well as other downhole tools. The terms battery and fuel cell will be used interchangeably in this specification. The battery may have a substantially ring-like form and be disposed within the annular portion of the downhole tool. In another embodiment, the battery may fill a recess formed in the wall of the downhole tool, or it may be located within a functional portion of the tool, itself. The battery comprises flexible components comprising an electrochemical generator housed within at least a partially compliant enclosure or housing. The compliant enclosure is in communication with downhole fluids in order to pressurize the electrochemical components. The electrochemical generator may be in communication with a downhole network for transmitting electronic signals between downhole tools connected in a tool string. The electrochemical generator may also be in communication with other downhole tools. The electrochemical components may comprise liquid and or solid state materials. In one embodiment, the inside or outside wall of the downhole tool may form all or a portion of the compliant battery housing. In another embodiment, die battery may be located within the operating components of the downhole tool and pressurized by direct and indirect communication with ambient pressures. The compliant nature of the fuel cell's or battery's enclosure permits the battery electrochemical components to experience the unique pressure and temperature conditions found downhole. The compliant portion of the battery's housing should be capable of withstanding the downhole environment which includes high pressure, high temperature, rapid accelerations, abrasive fluids, and corrosive gases. The materials suitable for the compliant portion of the enclosure may be selected from the group consisting of steel, stainless steel, and titanium. Non-metallic materials such as carbon composites, glass compresses and polymeric composites also may be used for the compliant portion of enclosure. As the depth of the well increases, the pressure and temperature conditions also increase downhole. Increased pressure downhole operates on the compliant portion of the enclosure and compresses the battery components. The pressure experienced by the battery components compensates for the high temperature downhole, extending the battery's range of performance to beyond 120.degree. C. The battery components comprise a compliant envelope or housing, a cathode oxidant, an anode reductant, a current collector, an ionic conductor, or diaphragm, and a sealed, insulated conductor for delivery of the current to equipment for conditioning the signal. The components of the electrochemical generator are sufficiently sealed and resilient to withstand pressurization to depths in excess of 20,000 feet.

PROPOSED DRAWINGS

DETAILED DESCRIPTION OF THE INVENTION

Figure 1:
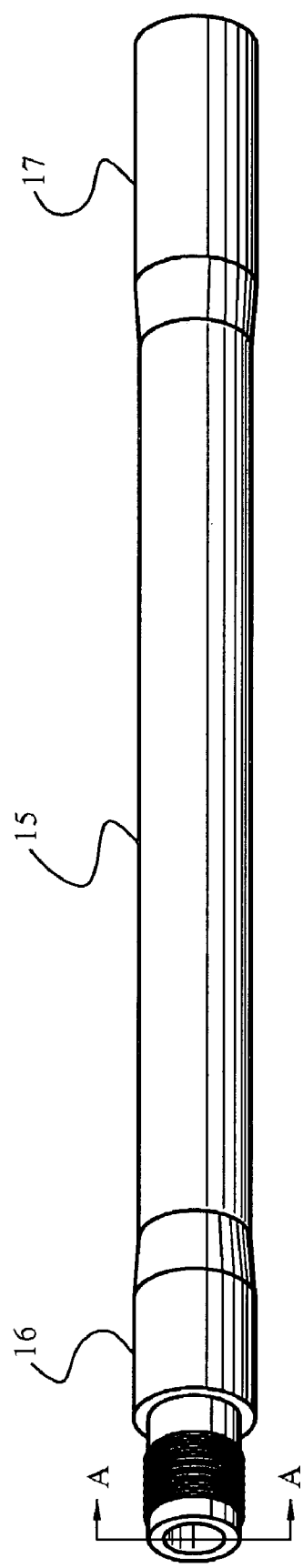
FIG. 1 is a perspective diagram of a downhole tool.

The present invention will be better understood in relation to the drawing figures.

FIG. 1 is a perspective diagram of a downhole tool. Generally, the overall shape of all downhole tools are constrained to the geometry of FIG. 1 in order to accommodate the well bore and to be connected in series in a drill string, or tool string. The tool comprises an elongate tubular body 15 that is attached to an externally threaded pin-end tool joint 16 and a internally threaded box-end tool joint 17. The tool joints may have outside diameters and wall thicknesses greater than the tubular body in order to facilitate handling and connection of the tool in the tool string.

Figure 2:
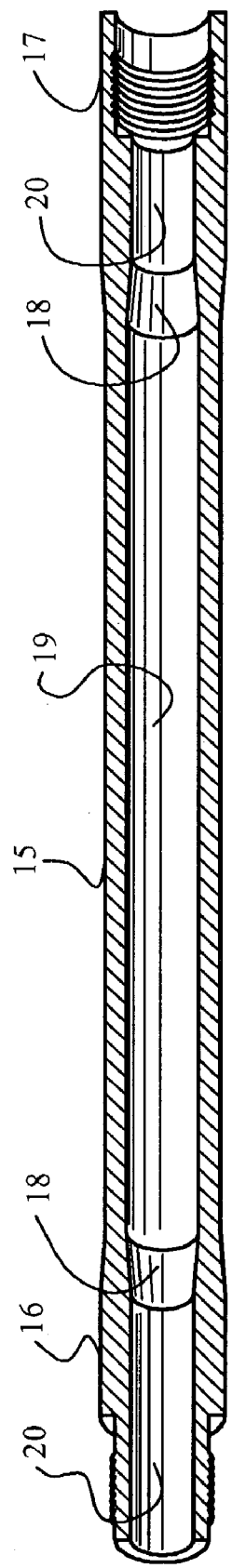
FIG. 2 is a perspective cross section diagram of a downhole tool taken along line AA.

FIG. 2 is a perspective cross-section diagram taken along line AA of FIG. 1. FIG. 2 depicts the elongate tubular body 15 connected to tool joints 16 and 17. FIG. 2 further depicts the bore 19 of the tubular body 15 transitioning in the region of 18 to the smaller bore diameter 20 of the tool joints. Some downhole tools may have a constant bore the full length of the tool.

Figure 3:
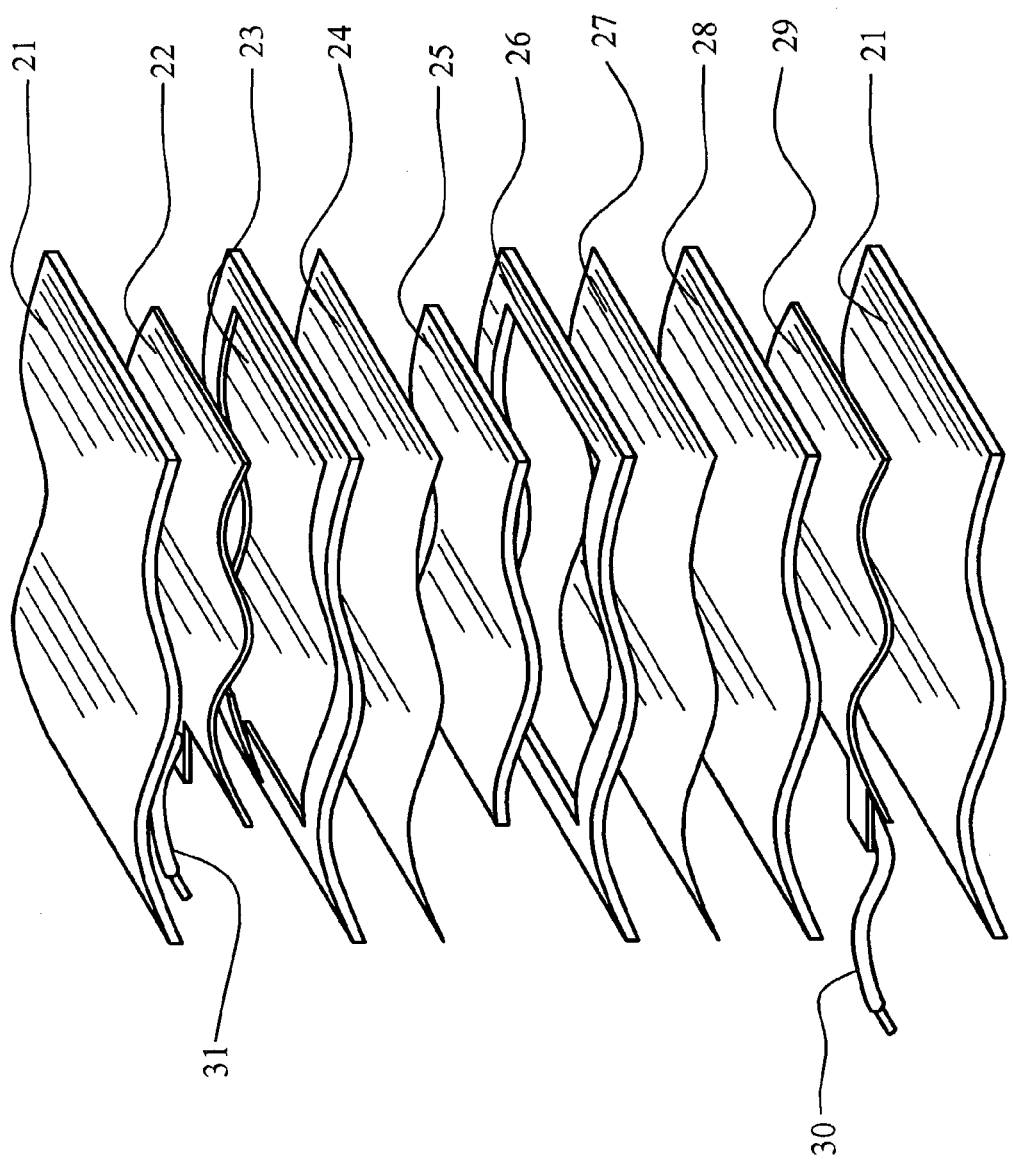
FIG. 3 is a schematic diagram of an electrochemical generator.

FIG. 3 is a schematic diagram of an embodiment of the electrochemical generator useful for the present invention. The electrochemical generator cell generally comprises a resilient casing 21, a positive copper metal foil 22 coated with an anode material which serves as a current collector, a housing 23 for the current collector 22, a dielectric separator 24, an electrolyte 25, a spacer housing 26, a dielectric separator 27, a negative copper metal foil 29 coated with a cathode material that serves as the negative current collector, a housing 28 for the current collector 29, and printed traces or insulated wire terminals 30 and 31. The components of the battery may be designed so that battery serves as a primary or secondary battery. A secondary battery is a rechargeable battery.

Other electrochemical power storage and generating systems may accommodate the constraints of a downhole system and be suitable for downhole use by exposing them to downhole pressure and temperature. All or part of such systems include liquid and solid state electrolyte systems as are disclosed in U.S. Pat. No. 6,506,511, to Lakeman, and U.S. Pat. No. 6,528,204, to Hikmet, all of which are incorporated herein by these references. The electrochemical systems disclosed in these references are configured so as to be includible within the physical constraints of a various downhole tools. Additionally, they demonstrate the breadth of electrolytic components that might benefit from being exposed to the downhole environment rather than being protected from it.

Figure 4:
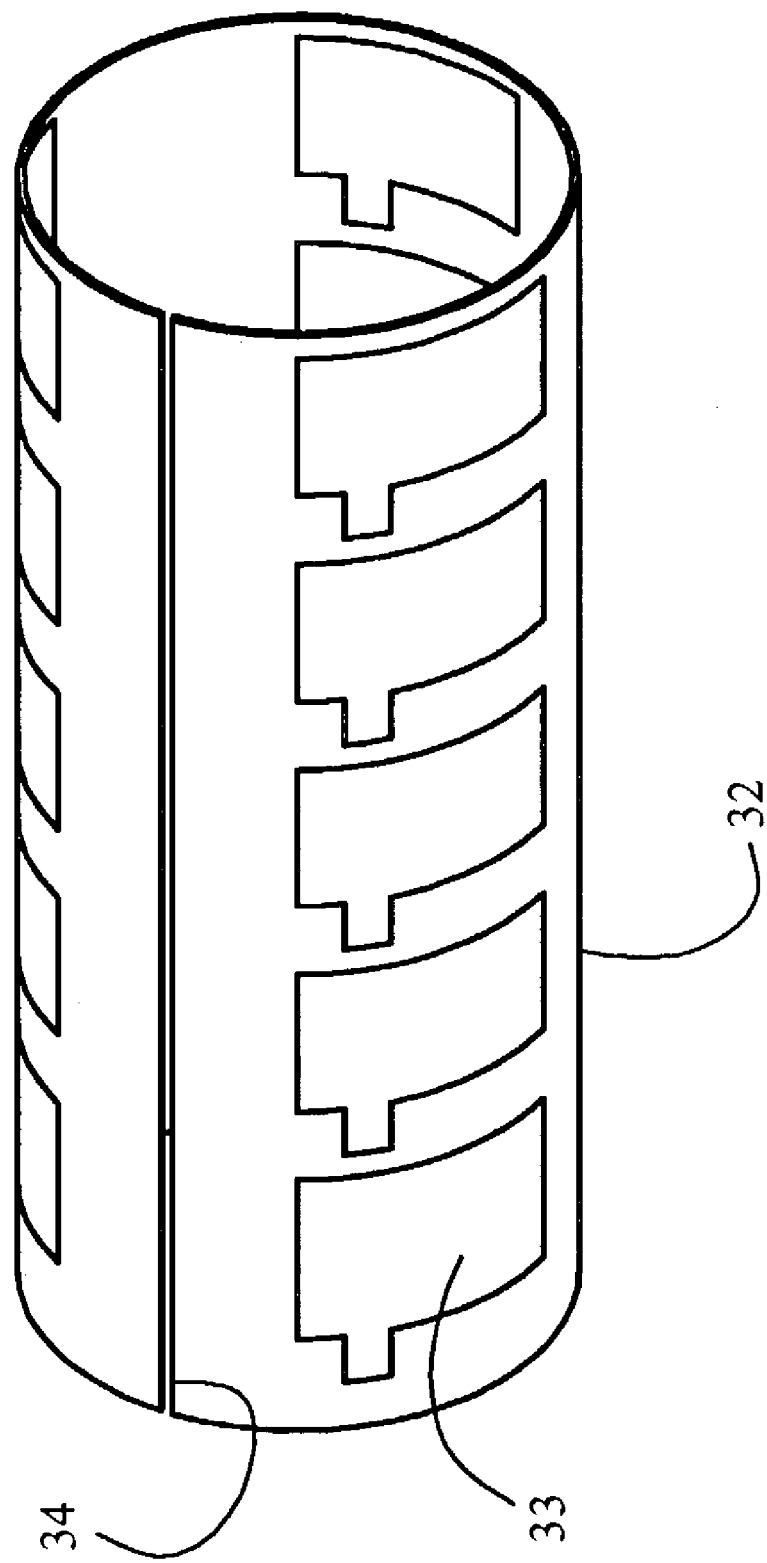
FIG. 4 is a schematic diagram an embodiment of the present invention comprising an annular battery.
Figure 5:
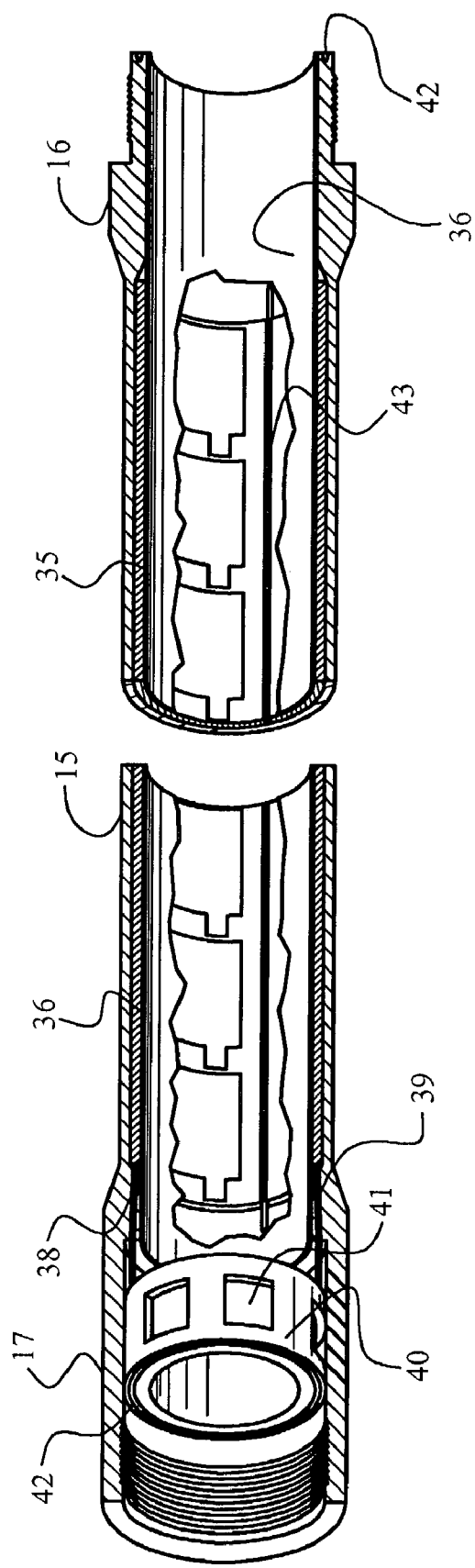
FIG. 5 is perspective cross-section diagram of the downhole battery of FIG. 4 disposed within the downhole tool of FIG. 1.

FIG. 4 is a diagram of an embodiment of the battery of the present invention comprising the interconnected electrochemical generating cells of FIG. 3. The annular casing 32 of the battery facilitates the installation of the battery into a downhole tool and the interconnection of the electrochemical cells 33. The annular casing 32 may be split by kerf 34 in order to spring the casing into position within the downhole tool as depicted in FIG. 5. Although not shown, the compliant nature of the battery casing and the electrochemical cells allows the battery to conform to a variety of shapes to meet the constraints of the downhole tool. For example, the battery may take on a generally polygonal, cylindrical, or semi-cylindrical form, in addition to that shown in FIG. 4.

FIG. 5 is a diagram of the battery of the present invention disposed within the tool depicted in FIG. 1. The figure is for illustration purposes only and does not limit the scope of the present invention. The downhole tool in FIG. 5 comprises elongate tube 15 connected to tool joints 16 and 17. The annular battery of FIG. 4 has been inserted into the tubular portion 15 of the tool and is identified in FIG. 5 as item 35. A compliant liner 36 has been inserted into the bore of the tool adjacent the battery 35. The liner 36 fits snugly against the inside wall of the tool joints in order to seal the battery from the fluids circulating through the bore of the tool. The inside wall of the tubular portion 15 of the tool and outside wall of the liner cooperate to form the housing for the battery. The wall of the liner 36 is thinner and more compliant that the wall of the tubular portion 15 of the tool. The electrochemical generator may be in communication with a transmission ring connected to another transmission ring by means of a coaxial conductor 43, the transmission rings comprising a housing, a ferrite trough or trough segments, and an insulated coil wire. Insulated conductors 38 and 39 are the positive and negative leads from the battery. The conductors are connected to a signal conditioning module 40 disposed within a portion of the box-end tool joint 17. The signal conditioning module 40 comprises recesses 41 suitable for housing electronic components that may be required for producing useful power front the battery. An annular electronic or magnetic connection 42 is provided in the module. The connection 42 may comprise a non-electronic, inductive coupling system as disclosed in U.S. Pat. No. 6,392,317, to Hall et al., incorporated herein by this reference, and in U.S. patent application Ser. Nos. 09/816,766 and 09/909,469, to Hall et al., with continuations and amendments thereto, incorporate herein by this reference. The compliant liner 36, which forms at least a portion of the battery's enclosure, serves to balance the pressure between the well bore and the battery's components. The balancing of the pressures and the pressurization of the battery's components, as the well depth increases, will offset the corresponding increase in ambient temperatures downhole. The pressurized condition of the battery's components will extend their thermal range of performance to above 120.degree. C., as there will be corresponding increases in the temperature conditions downhole.

Figure 6:
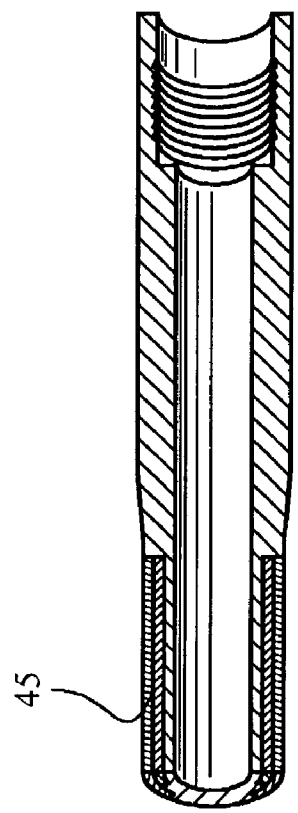
FIG. 6 is a diagram of a battery disposed within recesses in the outside wall of a downhole tool.
Figure 6:
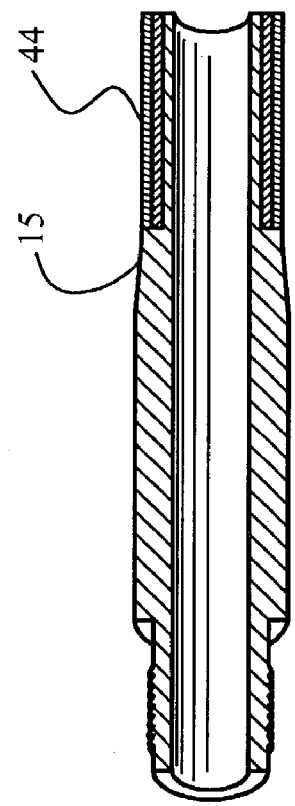

FIG. 6 is a diagram of another embodiment of the present invention. The elongate tube 15 of the downhole tool comprises a polygonal recess 44 in which the battery 45 of the present invention is installed. Complimentary recesses, not shown, in the wall of the tool may be provided to house the signal conditioning equipment required for downhole tools. The exterior surface of the battery, or the battery's casing, may comprise a material sufficiently resilient to withstand the rigors of downhole use and still permit pressure balancing of the battery's components with the downhole environment.

Figure 7:
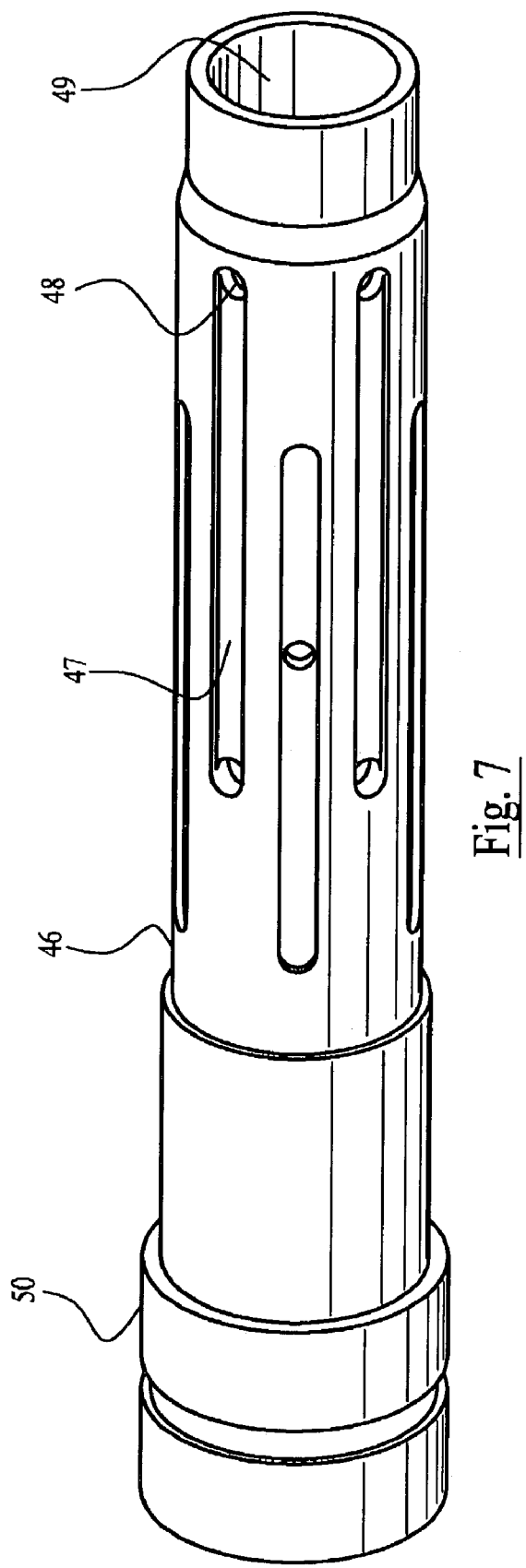
FIG. 7 is a schematic diagram of a downhole tool adapted for receiving a battery of the present invention within recesses formed within the wall of the tool.

FIG. 7 is a diagram of a downhole tool module adapted for receiving a battery of the present invention. The module is designed to fit cooperatively within the downhole tool depicted in FIG. 1. The module comprises a through bore 49 and an interior surface 46 intermediate the bore 49 and the major diameter 50 of the tool. Adjacent the interior surface 46 are formed recesses 47 which are in communication with the bore 49 through openings 48. The recesses 47 will admit to the disposition of the battery of the present invention. Since the walls of the module are not sufficiently compliant to transfer downhole pressure to the battery components, openings 48 are provided. Openings 48 may be filled with a compliant material suitable for sealing the battery components from the intrusive fluids circulating through the bore of the tool, yet capable of transferring well bore pressure to the battery components. In this manner, a pressure balanced battery may be installed within functioning components of a variety of downhole tools.

We claim:

1. A pressure-balanced battery for downhole tools, comprising a compliant electrochemical cell disposed within at least a partially compliant enclosure of a downhole tool.

2. The battery of claim 1, wherein the compliant enclosure is in communication with downhole fluids.

3. The battery of claim 1, wherein the electrochemical cell comprises an ion conductor, anode and cathode materials, an electrolyte, a current collector and insulated conductors.

4. The battery of claim 1, wherein the electrochemical cell is in communication with at least one other electrochemical cell.

5. The battery of claim 1, wherein the electrochemical cell comprises a fluid electrolyte.

6. The battery of claim 1, wherein the electrochemical cell comprises a solid electrolyte.

7. The battery of claim 1, wherein the electrochemical cell comprises a fuel cell.

8. The battery of claim 1, wherein the electrochemical cell comprises a flexible casing.

9. The battery of claim 1, wherein the electrochemical cell is linked together with at least one other electrochemical cell, the electrochemical cells housed within a flexible casing having one of a generally polygonal shape, a generally cylindrical shape, and a generally semi-cylindrical shape.

10. The battery of claim 1, wherein the electrochemical cell is disposed-within a recess formed within the wall of a downhole tool.

11. The battery of claim 1, wherein the at least partially compliant enclosure comprises an annulus formed by an inside wall of a downhole tool and an outside wall of a compliant tool liner.

12. The battery of claim 1, wherein the electrochemical cell is in communication with a downhole network for transmitting electronic signals between downhole tools connected in a tool string.

13. The battery of claim 1, wherein the electrochemical cell is in communication with other downhole tools.

14. The battery of claim 1, wherein the electrochemical cell is in communication with a transmission ring connected to another transmission ring by means of a coaxial conductor.

15. The battery of claim 1, wherein the electrochemical cell is connected to an electronic module disposed within the downhole tool.

16. The battery of claim 1, wherein the electrochemical cell is rechargeable.

17. The battery of claim 1, wherein the battery has an operable range above 120 degrees C.

18. The battery of claim 1, wherein the battery is pressurized by ambient downhole pressures.

19. The battery of claim 1, wherein the enclosure is at least partially formed from at least one of a housing and a liner.

20. The battery of claim 1, wherein the enclosure is made of a material selected from the group consisting of steel, stainless steel, titanium, carbon composites, glass composites, and polymeric composites.

* * * * *